United States Patent
Boni

(10) Patent No.: US 7,188,657 B2
(45) Date of Patent: Mar. 13, 2007

(54) MACHINE FOR FITTING AND REMOVING VEHICLE WHEEL TIRES

(75) Inventor: Dido Boni, Reggio Emilia (IT)

(73) Assignee: Sicam S.R.L., Coreggio (IT)

(*) Notice: Subject to any disclaimer, the term of this patent is extended or adjusted under 35 U.S.C. 154(b) by 0 days.

(21) Appl. No.: 11/192,177

(22) Filed: Jul. 29, 2005

(65) Prior Publication Data

US 2006/0027334 A1   Feb. 9, 2006

(30) Foreign Application Priority Data

Aug. 3, 2004   (IT) .......................... MO2004A0205

(51) Int. Cl.
*B60C 25/135*   (2006.01)
(52) U.S. Cl. .................. 157/1.24; 157/1.17; 157/1.2; 157/1.28
(58) Field of Classification Search ................. 157/1.1, 157/1.17, 1.2, 1.24, 1.26, 1.28, 1.44
See application file for complete search history.

(56) References Cited

U.S. PATENT DOCUMENTS

| 4,606,393 A | 8/1986 | Cuccolini et al. |
| 5,758,703 A * | 6/1998 | Mimura ...................... 157/1.28 |
| 6,619,362 B2 * | 9/2003 | Corghi ....................... 157/1.24 |
| 6,629,554 B2 * | 10/2003 | Mimura ...................... 157/1.24 |

FOREIGN PATENT DOCUMENTS

| EP | 0 042 363 A | 12/1981 |
| EP | 1 584 496 A | 10/2005 |

* cited by examiner

*Primary Examiner*—Lee D. Wilson
*Assistant Examiner*—Anthony Ojini
(74) *Attorney, Agent, or Firm*—Hoffman, Wasson & Gitler

(57) ABSTRACT

A machine for fitting and removing vehicle wheel tires, comprising a supporting frame for elements for coupling and rotating a rim about a rotation axis and for a working arm provided with one end on which a working head is supported for fitting and removing a tire on and from the rim, the coupling and rotation elements being movably associated with the frame by interposing elements for movement on a plane that is substantially perpendicular to the rotation axis, the arm being movably associated with the frame by way of the interposition of first elements for translational actuation in a direction that is substantially parallel to the rotation axis of the rim, second actuation elements being interposed between the arm and the first actuation elements and being adapted to allow the arm to move between a first active end configuration, in which the working head is arranged proximate to the first actuation elements, and a second active end configuration, in which the working head is substantially spaced with respect to the first actuation elements.

14 Claims, 3 Drawing Sheets

MACHINE FOR FITTING AND REMOVING VEHICLE WHEEL TIRES

The present invention relates to a machine for fitting and removing vehicle wheel tires, particularly for very heavy and bulky wheel tires.

BACKGROUND OF THE INVENTION

It is known that vehicle wheels are generally constituted by a metallic rim which is provided, on its peripheral region, with annular flanges between which an elastic tire is keyed; the end portions of the tire, known as beads, each abut against a respective flange of the rim.

To perform the operations for fitting and removing tires and the corresponding rims, so-called tire changing machines are currently used which allow to remove the tire from the corresponding rim in order to perform for example maintenance or replacement of the inner tube and to subsequently refit the same tire or a replacement tire on the wheel rim.

Particularly strong and sturdy automatic tire changing machines are known for fitting/removing very heavy and bulky wheels, such as wheels for trucks, farming tractors, earth-moving machines, or such as special wheels with diameters of three meters or more.

These machines are constituted substantially by a supporting frame for means for coupling and turning, about a horizontal axis, a rim on/from which the tire is to be fitted/removed and for a working assembly provided with a working head for fitting and removing the tire.

Such working head is generally provided with a bead breaker tool, which is suitable to be inserted between the beads of the tire and the corresponding annular flanges of the rim in order to separate them, and an extractor tool, which is provided with a curved end part suitable to engage the beads of the tire and move them away from the corresponding rim.

In a first type of tire changing machine for very heavy and bulky wheels, the coupling and turning means are supported on an elongated rigid structure, which is associated with the frame so that it can rotate about an oscillation axis that is parallel to the rim rotation axis; accordingly, such means can be moved along a circular path that lies along a plane that is perpendicular to the rotation axis.

The working head is instead mounted on a working arm, which has a preset length and can slide with respect to the frame by means of a slider engaged along a straight guide, which is rigidly associated with the frame and is parallel to the rim rotation axis.

During fitting and removal operations, the direction determined by the working arm is substantially perpendicular to the rotation axis and its inclination with respect to the ground, which is fixed and determined during production, is generally approximately 39°.

In these tire changing machines, the supporting structure of the coupling and rotation means can be turned about the oscillation axis in order to change its distance from the ground and facilitate the coupling/separation of the rim.

Further, the movement of the elongated structure is important in order to move the rim rotation axis toward/away from the working head and arrange the wheel in the correct working position, i.e., the position in which the circumferential portion of the rim is arranged proximate to the tools.

These known types of machine are susceptible of further improvements aimed in particular at increasing their flexibility and efficiency in use.

Such machines in fact have working arms which are inconveniently long, their dimensions being determined by the need to arrange the working head at such a distance from the ground as to allow to work even with the largest special wheels, the rims of which must be arranged at a considerable height due to the considerable radial dimensions of the tires.

In practice, this forces the user to arrange even the smaller wheels at considerable heights.

It should be noted in fact that truck wheels or wheels for farming tractors, which have substantial weights and dimensions but not as much as special wheels having a diameter of three meters, are arranged so that their tread lies at a distance from the ground that sometimes exceeds 60 centimeters.

Fitting/removing tires in such conditions, in addition to being particularly awkward and scarcely practical, is also considerably dangerous for the safety of the operator, who might be struck by the falling wheel if the rim disengages accidentally from the coupling and rotation means.

SUMMARY OF THE INVENTION

The aim of the present invention is to eliminate the drawbacks mentioned above of the background art, by providing a machine for fitting and removing vehicle wheel tires, which allows to arrange the tread of the wheels being treated at a reduced distance from the ground regardless of their dimensions and allows to perform fitting and removal operations in a manner that is simple, fast and safe for the operator.

Within this aim, an object of the present invention is to provide a machine that is simple, relatively easy to provide in practice, safe in use, effective in operation, and has a relatively low cost.

This aim and this and other objects that will become better apparent hereinafter are achieved by the present machine for fitting and removing vehicle wheel tires, which comprises a supporting frame for means for coupling and rotating a rim about a rotation axis and for a working arm provided with one end on which a working head is supported for fitting and removing a tire on and from said rim, said coupling and rotation means being movably associated with said frame by interposing means for movement on a plane that is substantially perpendicular to said rotation axis, said arm being movably associated with said frame by way of the interposition of first means for translational actuation in a direction that is substantially parallel to said rotation axis, characterized in that said arm is associated with said first actuation means by interposing second actuation means, which are adapted to allow said arm to move between a first active end configuration, in which the working head is arranged proximate to the first actuation means, and a second active end configuration, in which the working head is substantially spaced with respect to the first actuation means.

BRIEF DESCRIPTION OF THE DRAWINGS

Further characteristics and advantages of the present invention will become better apparent from the following detailed description of a preferred but not exclusive embodiment of a machine for fitting and removing vehicle wheel tires, illustrated by way of non-limiting example in the accompanying drawings, wherein.

DESCRIPTION OF THE PREFERRED EMBODIMENTS

Figure 1:
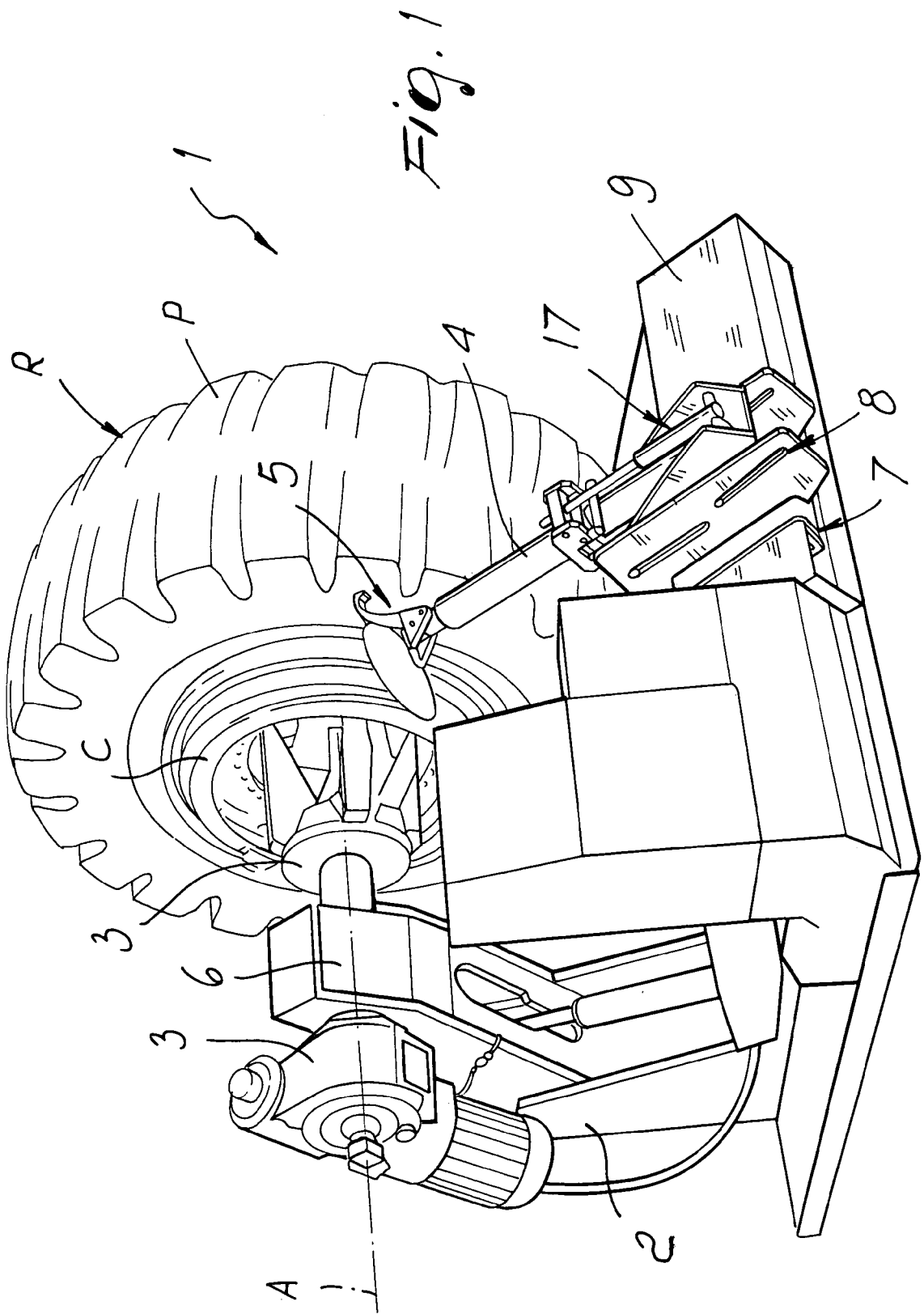
FIG. 1 is a schematic and partial perspective view of the machine according to the invention.
Figure 2:
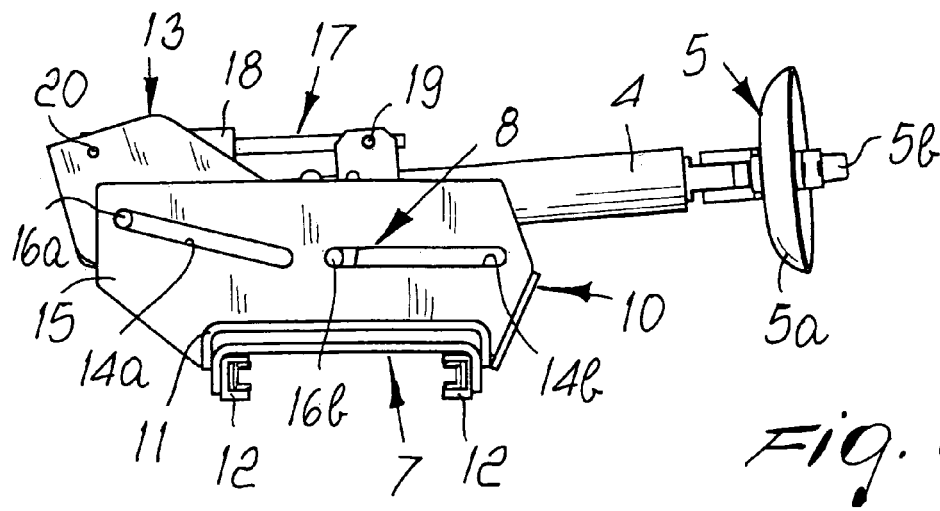
FIG. 2 is a side elevation view of the sliders and of the working arm of the machine according to the invention, with the arm arranged in a first end configuration.
Figure 3:
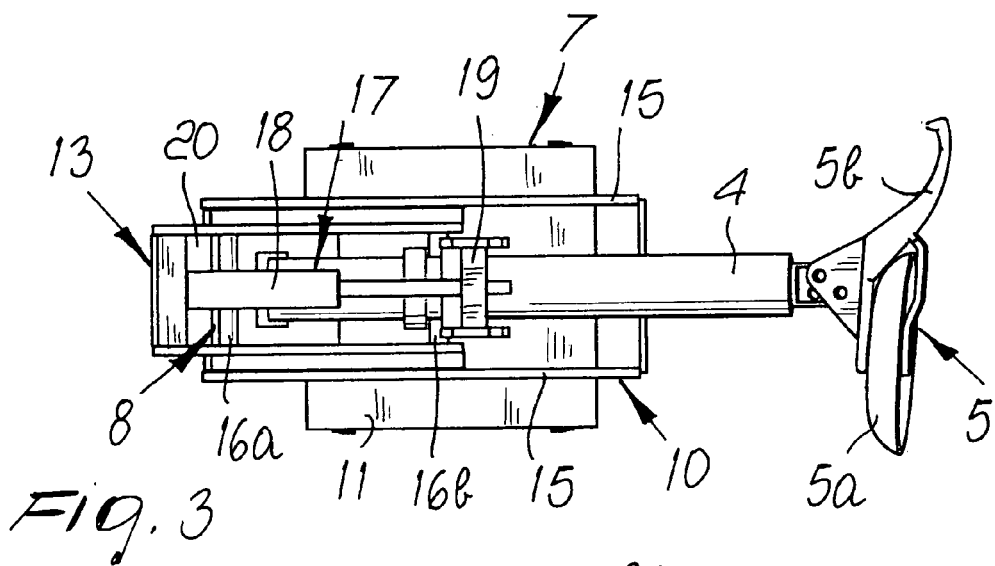
FIG. 3 is a top view of the sliders and of the arm of FIG. 2.
Figure 4:
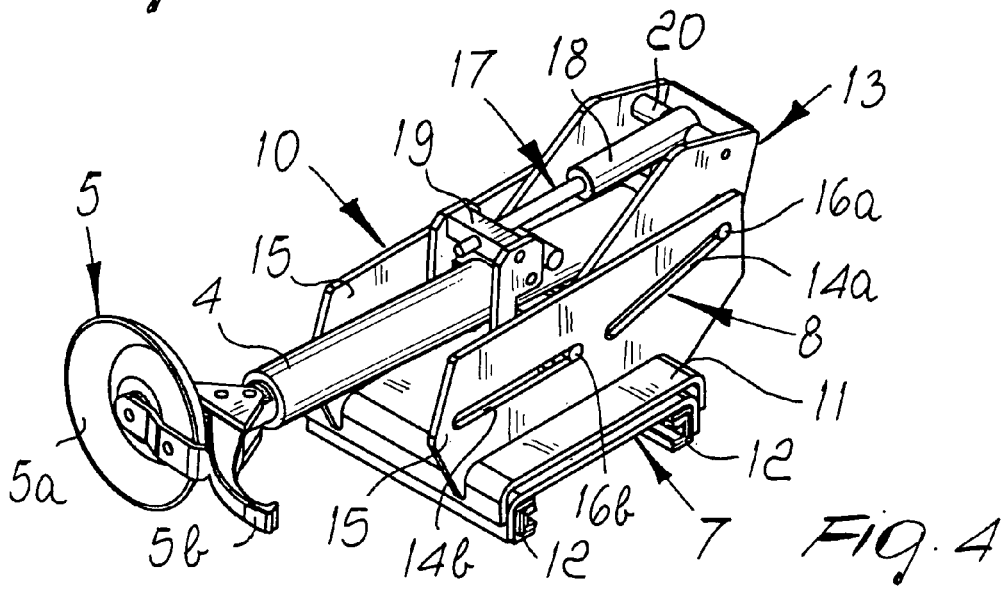
FIG. 4 is an axonometric view of the sliders and of the arm of FIG. 2.
Figure 5:
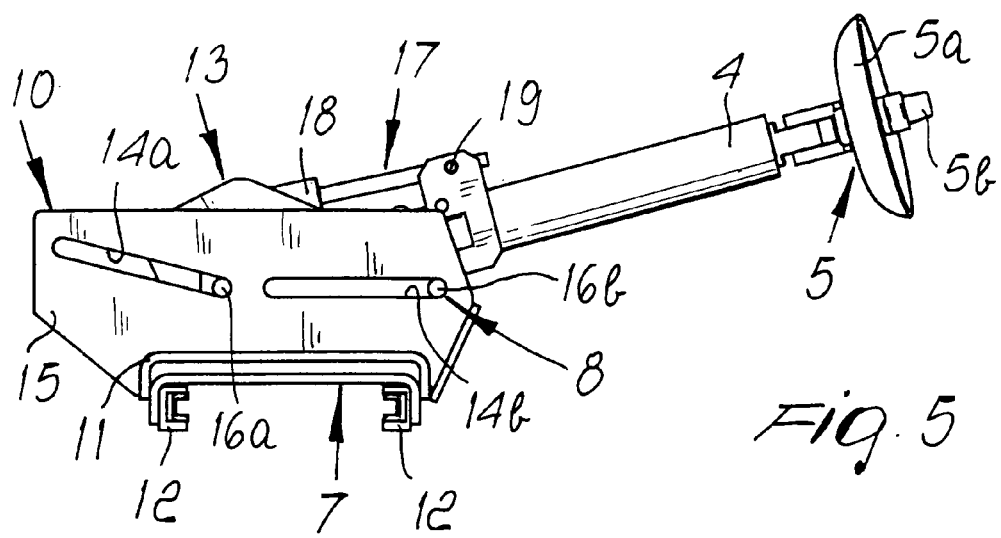
FIG. 5 is a side elevation view of the sliders and of the working arm of the machine according to the invention, with the arm arranged in a second end configuration.
Figure 6:
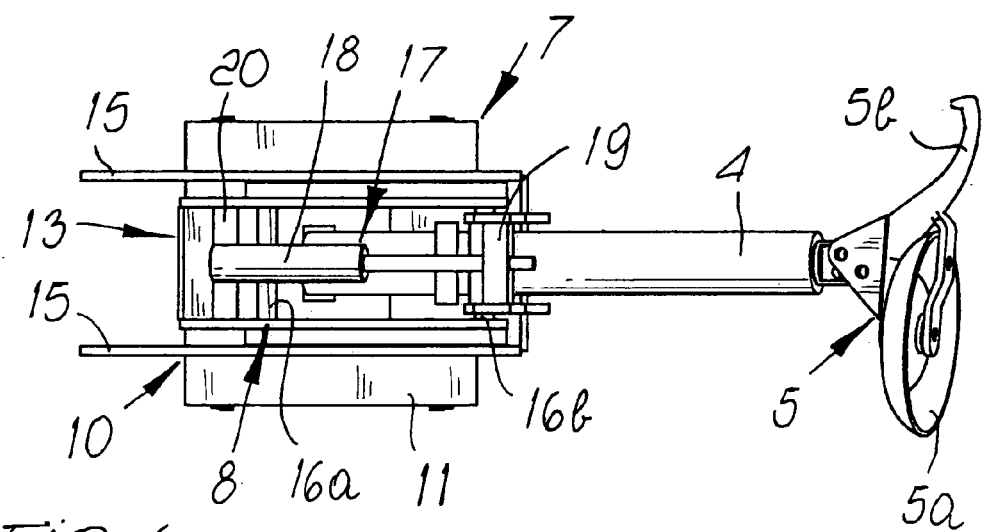
FIG. 6 is a top view of the sliders and of the arm of FIG. 5.
Figure 7:
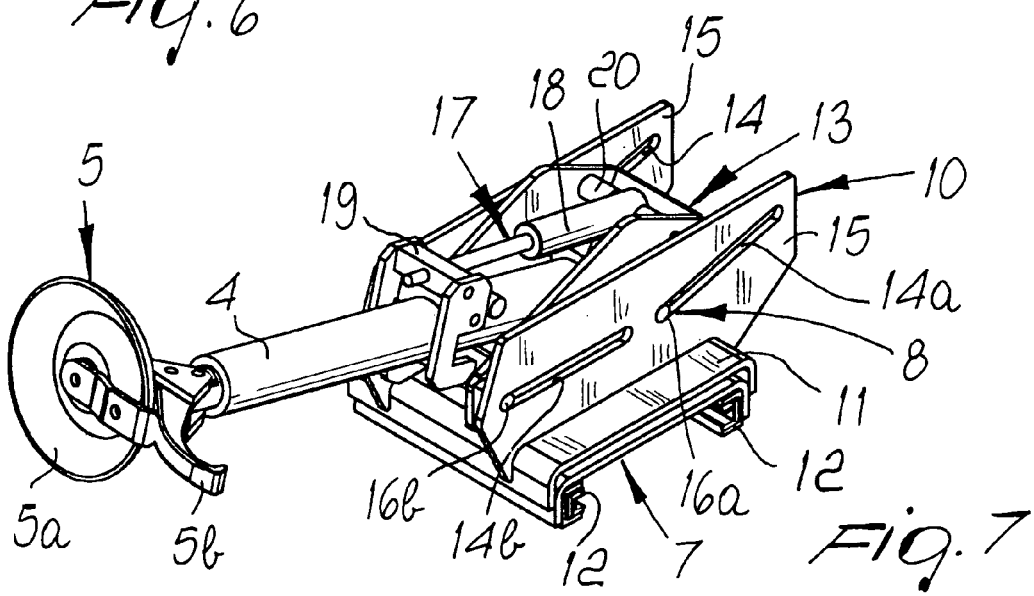
FIG. 7 is an axonometric view of the sliders and of the arm of FIG. 5.

With reference to the figures, the reference numeral 1 generally designates a machine for fitting and removing vehicle wheel tires.

The machine 1 comprises a supporting frame 2 for means 3 for coupling and turning a rim C of a wheel R about a horizontal rotation axis A and for a working arm 4 provided with one end which supports a working head 5 for fitting and removing a tire P on and from the rim C.

The means 3, in particular, are associated with the frame 2 by way of the interposition of movement means capable of allowing their movement on a plane which is substantially perpendicular to the rotation axis A.

Such movement means are constituted for example by a rigid structure 6 for supporting the means 3, which is pivoted to the frame 2 and can rotate with respect to it about an axis that is parallel to the rotation axis A.

The working head 5 comprises a bead breaker tool 5a and an extractor tool 5b, which are arranged on diametrically opposite sides with respect to the axis of the arm 4, the working head 5 being able to rotate about such axis in order to position in front of the wheel R the tool that is most suited for work.

The arm 4 is kept substantially at right angles to the rotation axis A and is associated with the frame 2 by interposing first means 7 for translational actuation in a direction that is parallel to said axis.

According to the invention, the arm 4 is associated with the first actuation means 7 by way of the interposition of second actuation means 8, which allow it to move between a first active end configuration, in which the working head 5 is arranged proximate to the first actuation means 7 and is spaced from the rotation axis A, and a second active end configuration, in which the working head 5 is spaced with respect to the first actuation means 7 and lies proximate to the rotation axis A.

Further, these second actuation means are suitable to change the inclination of the arm 4 with respect to the ground during its movement between the two end working configurations; in practice, the arm 4 can assume several intermediate working configurations, which are comprised between the end configurations and in each of which it has a different inclination and supports the working head 5 at a different distance from the second actuation means 8.

Conveniently, the first actuation means 7 comprise first straight guiding means, such as a pair of rails, which are rigidly connected to the frame 2, are parallel to the rotation axis A, are contained within a protective housing 9 and are not shown in the figures.

A first slider 10 is engaged slidingly along the first straight guiding means and supports the second actuation means 8.

In particular, the slider comprises a plate 11, below which two mutually facing C-shaped bodies 12 are arranged, each one of said bodies being engaged so that it can slide along one of the rails; two mutually parallel walls 15, perpendicular to the first guiding means, protrude above the plate 11.

In order to move the first slider 10 along the first guiding means of the machine 1, the first actuation means 7 comprise a first fluid-operated actuator of the linear type (jack) or of the rotary type (with a chain and/or gear drive), enclosed within the housing 9 and not shown.

Advantageously, the second actuation means 8 comprise second guiding means, which are formed on the first slider 10 and along which a second slider 13 is engaged so that it can slide, said second slider supporting the end of the arm 4 that lies opposite the working head 5.

Such second guiding means comprise two slots, each of which is constituted by a first portion 14a and a second portion 14b, both of which are straight and are provided through a corresponding wall 15 of the first slider 10.

The portions 14a and 14b of one slot are identical and face, in a mirror-symmetrical manner, the portions 14a and 14b of the other slot and are engaged respectively by a first pin 16a and by second pin 16b, which lie transversely with respect to the arm 4 and are associated with the second slider 13, which in particular is arranged between the walls 15.

The slots are such as to guide the second slider 13 in a combined motion (rotary and translational motion) between the two end working configurations.

In particular, as they move from the first configuration to the second one, the arm 4 increases its inclination with respect to the ground, while the working head 5 traces a curved path in which the concavity is directed upward.

This allows, regardless of the height of the means 3 from the ground, to arrange the arm 4 along a direction that remains proximate and as incident as possible to the rotation axis A, thus facilitating the intervention of the tools 5a and 5b during work.

In the particular embodiment of the present invention illustrated in the figures, the combined motion is obtained by way of the fact that the straight portions 14a and 14b of each slot are mutually inclined; however, alternative embodiments are not excluded in which the slots have different shapes and profiles, as in the case in which they are substantially curved.

The movement of the second slider 13 with respect to the first slider 10 is obtained by means of a second fluid-operated actuator, the movement of the arm 4 being adjusted by the amount of fluid processed, or by means of a mechanically-actuated actuator of the worm screw type, the adjustment of the relative position between the sliders 10 and 13 being obtained by manual rotation of a crank connected to said screw; such actuators are not shown in detail in the figures.

Finally, the arm 4 is associated with the second slider 13 by interposing third means 17 for rotary actuation about an axis that is substantially parallel to the rotation axis A.

The arm 4 is in fact pivoted to the bottom of the second slider 13 and a third fluid-operated actuator 18 of the linear type is arranged above it, its ends being associated with a first hinge 19 and with a second hinge 20, which are pivoted respectively to the arm 4 and to the second slider 13.

The actuation of the third actuator is designed to move the arm 4 away from/toward the wheel R when it is not active, allowing for example to arrange the working head 5 in front of both of the beads of the tire P without having to remove the rim C from the means 3.

The operation of the present invention is as follows: initially, the user fits the rim C on the means 3, which he then arranges at a particularly modest height from the ground, which in practice is determined by the radial dimensions of the tire P.

Finally, by maneuvering the first and second actuation means 7 and 8, the user can arrange the working head 5 proximate to the circumferential portion of the rim C, regardless of its distance from the ground.

For wheels R with small tires P, in particular, the user can arrange the means 3 at a modest height and arrange the arm 4 proximate to the first end working configuration.

For wheels R with particularly large tires P, instead, the means 3 can be arranged higher, with the arm 4 proximate to the second end working configuration.

In practice it has been found that the described invention achieves the proposed aim and object, and in particular the fact is stressed that it allows to simplify and increase the safety of operations for fitting and removing tires, the treads of which can be arranged at limited distances from the ground regardless of their dimensions.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements without thereby abandoning the scope of the protection of the appended claims.

The disclosures in Italian Patent Application No. MO2004A000205 from which this application claims priority are incorporated herein by reference.

What is claimed is:

1. A machine for fitting and removing vehicle wheel tires, comprising a supporting frame, for holding means for coupling and rotating a rim about a rotation axis, a working arm provided with one end on which a working head is supported for fitting and removing a tire on and from said rim, said coupling and rotation means being movably associated with said frame by interposing means for movement on a plane that is substantially perpendicular to said rotation axis, said working arm being movably associated with said frame by way of the interposition of first actuation means for translational actuation in a direction that is substantially parallel to said rotation axis and being associated with said first actuation means by interposing second actuation means, which are adapted to allow said working arm to move between a first active end configuration, in which the working head is arranged proximate to the first actuation means, and a second active end configuration, in which the working head is substantially spaced with respect to the first actuation means, wherein said first actuation means comprise first rectilinear guiding means, along which a first slider is engaged slidingly and supports said second actuation means.

2. The machine of claim 1, wherein said second actuation means are adapted to modify an inclination of said arm with respect to the ground between said active end configurations.

3. The machine of claim 1, wherein said second actuation means comprise second guiding means, along which a second slider which supports said arm is engaged so that it can slide.

4. The machine of claim 3, wherein said second guiding means comprise at least one slot, which is formed on said first slider, and at least one pin, which is associated with said second slider and is engaged so tat it can slide along said slot.

5. The machine of claim 4, wherein said slot is formed through a wall of said fast slider which is substantially perpendicular to said first straight guiding means.

6. The machine of claim 4, wherein said slot is substantially straight.

7. The machine of claim 4, wherein said slot comprises at least two mutually inclined straight portions.

8. The machine of claim 4, wherein said slot is substantially curved.

9. The machine of claim 4, wherein said second guiding means comprise at least one pair of said slots, which are mutually substantially identical and face each other mirror-symmetrically on two of said walls of said first slider, said second slider being arranged between the walls.

10. The machine of claim 3, wherein said arm is associated with said second slider at the end that lies opposite said working head.

11. The machine of claim 1 wherein said second actuation means comprise at least one fluid-operated actuator.

12. The machine of claim 1, wherein said second actuation means comprise at least one mechanically-actuated actuator.

13. A machine for fitting and removing vehicle wheel tires, comprising a supporting frame, means for coupling and rotating a rim about a rotation axis, a working arm provided with one end of which a working head is supported for fitting and removing a tire on and from said rim, said coupling and rotation means being movably associated with said frame by interposing means for movement on a plane that is substantially perpendicular to said rotation axis, said working arm being movably associated with said frame by way of the interposition of first actuation means for translational actuation in a direction that is substantially parallel to said rotation axis and being associated with said first actuation means by interposing second actuation means, which are adapted to allow said arm to move between a first active end configuration, in which the working head is arranged proximate to the first actuation means, and a second active end configuration, in which the working head is substantially spaced with respect to the first actuation means, wherein said arm is associated with said second slider by interposing third means for rotary actuation about an axis that is substantially parallel to said rotation axis.

14. The machine of claim 13, wherein said third actuation means comprise at least one fluid-operated actuator.

* * * * *